United States Patent
Li

(10) Patent No.: US 12,052,514 B2
(45) Date of Patent: Jul. 30, 2024

(54) IMAGING PROCESSING METHOD AND APPARATUS FOR A CAMERA MODULE IN A NIGHT SCENE, AN ELECTRONIC DEVICE, AND A STORAGE MEDIUM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

(*) Notice: Subject to any disclaimer, the term of this patent is extended or adjusted under 35 U.S.C. 154(b) by 351 days.

(21) Appl. No.: 17/467,366

(22) Filed: Sep. 6, 2021

(65) Prior Publication Data

US 2021/0400172 A1    Dec. 23, 2021

Related U.S. Application Data

(63) Continuation of application No. PCT/CN2020/077821, filed on Mar. 4, 2020.

(30) Foreign Application Priority Data

Mar. 6, 2019  (CN) .......................... 201910167837.8

(51) Int. Cl.
*H04N 23/81*  (2023.01)
*G06F 18/22*  (2023.01)
(Continued)

(52) U.S. Cl.
CPC .............. *H04N 23/81* (2023.01); *G06F 18/22* (2023.01); *G06T 7/70* (2017.01); *G06V 10/40* (2022.01); *H04N 23/71* (2023.01)

(58) Field of Classification Search
None
See application file for complete search history.

(56) References Cited

U.S. PATENT DOCUMENTS

2009/0278961 A1* 11/2009 Mohanty ............... H04N 9/646
                                                        348/241
2015/0373235 A1   12/2015 Chiang et al.
(Continued)

FOREIGN PATENT DOCUMENTS

CN      101106685 A     1/2008
CN      102238316 A    11/2011
(Continued)

OTHER PUBLICATIONS

The International Search Report mailed Jun. 4, 2020; PCT/CN2020/077821 with English translation.

*Primary Examiner* — Cynthia Segura
(74) *Attorney, Agent, or Firm* — Frank Gao, Esq.

(57) ABSTRACT

Embodiments of the present invention relate to an image processing method and apparatus for a camera module in a night scene, an electronic device, and a storage medium. The method includes: obtaining a multi-frame target image; performing first noise reduction processing on each frame of target image in the multi-frame target image, to obtain intra-frame processing results of the multi-frame target image; performing second noise reduction processing on any two adjacent frames of target images in the multi-frame target image, to obtain inter-frame processing results; and generating an enhanced night scene effect image of the target image according to the intra-frame processing result and the inter-frame processing result.

17 Claims, 6 Drawing Sheets

(51) Int. Cl.
   *G06T 7/70*      (2017.01)
   *G06V 10/40*     (2022.01)
   *H04N 23/71*     (2023.01)

(56) References Cited

U.S. PATENT DOCUMENTS

2018/0343448 A1* 11/2018 Possos ................. H04N 19/176
2022/0058775 A1*  2/2022 Duan ................... H04N 19/117
2022/0256076 A1*  8/2022 Douady ............... H04N 19/597
2023/0217109 A1*  7/2023 Bryson ................ H04N 23/683
                                                       348/208.6

FOREIGN PATENT DOCUMENTS

| CN | 104767913 A |  7/2015 |
| CN | 105208376 A | 12/2015 |
| CN | 105654428 A |  6/2016 |
| CN | 105809630 A |  7/2016 |
| CN | 109348089 A |  2/2019 |
| CN | 109873953 A |  6/2019 |

* cited by examiner

IMAGING PROCESSING METHOD AND APPARATUS FOR A CAMERA MODULE IN A NIGHT SCENE, AN ELECTRONIC DEVICE, AND A STORAGE MEDIUM

CROSS-REFERENCE TO RELATED APPLICATIONS

This application is a continuation of national application No. PCT/CN2020/077821, filed on Mar. 4, 2020, which claims priority to Chinese Patent Application No. 201910167837.8, filed on Mar. 6, 2019, which is incorporated herein by reference in its entirety.

TECHNICAL FIELD

The present application relates to the field of image processing technologies and in particular, to an image processing method and apparatus for a camera module in a night scene, an electronic device, and a storage medium.

BACKGROUND

Since the advent of image sensors such as a CMOS and a CCD that convert acquired optical signals into corresponding analog electrical signals, a digital camera is popular and widely applied to many different fields and plays an important role in people's lives due to advantages such as convenient data storage, compactness and easy adjustment and control of photographing parameters.

However, due to limitations of a physical structure and a manufacturing process of the image sensor, it is difficult for the digital camera to provide excellent photographing effects when photographing is performed in some environments with insufficient light and relatively low brightness (for example, outdoors at night and a dim auditorium). As a result, a problem such as smear or excessive noise is prone to occur in a photo.

Improving performance of an optical lens or increasing a size of the image sensor is a feasible way to improve the photographing effect. However, the hardware needs to be upgraded at the expense of increasing costs or increasing a volume of the camera. As a result, scenarios to which the feasible way is applicable are greatly restricted.

SUMMARY

To resolve the foregoing technical problem, embodiments of the present invention provide an image processing method and apparatus for a camera module in a night scene, an electronic device, and a storage medium that can improve a photographing effect of a digital camera.

To resolve the foregoing technical problem, the embodiments of the present invention provide the following technical solution: an image processing method. The image processing method includes:
  obtaining a multi-frame target image;
  performing first noise reduction processing on each frame of target image in the multi-frame target image, to obtain intra-frame processing results of the multi-frame target image, where the first noise reduction processing is used for filtering out spatial domain noise of the each frame of target image in the multi-frame target image;
  performing second noise reduction processing on any two adjacent frames of target images in the multi-frame target image, to obtain inter-frame processing results, where the second noise reduction processing is used for filtering out time domain noise between any two adjacent frames of target images in the multi-frame target image; and generating an enhanced night scene effect image of the target image according to the intra-frame processing result and the inter-frame processing result.

Optionally, the performing first noise reduction processing on each frame of target image in the multi-frame target image, to obtain intra-frame processing results includes:
  sequentially detecting a frequency characteristic of each pixel point in each frame of target image in the multi-frame target image in a spatial domain; and
  performing image filtering processing corresponding to the frequency characteristic according to the frequency characteristic of the each pixel point in the spatial domain, to obtain the intra-frame processing results.

Optionally, the sequentially detecting a frequency characteristic of each pixel point in each frame of target image in the multi-frame target image in a spatial domain includes:
  respectively calculating spatial domain distances between a selected target pixel point and a plurality of pixel points adjacent to the target pixel point, where the spatial domain distances indicate grayscale differences between the selected target pixel point and the pixel points adjacent to the target pixel point; and
  determining a frequency characteristic of the target pixel point according to the spatial domain distances and a frequency threshold.

Optionally, the frequency characteristic includes a low frequency and a high frequency; and
  the determining a frequency characteristic of the target pixel point according to the spatial domain distances and a frequency threshold specifically includes:
  determining whether the spatial domain distances between the target pixel point and the plurality of pixel points adjacent to the target pixel point are all less than the frequency threshold;
  determining the frequency characteristic of the target pixel point as the low frequency if the spatial domain distances are all less than the frequency threshold; and
  determining the frequency characteristic of the target pixel point as the high frequency if the spatial domain distances are not all less than the frequency threshold.

Optionally, the performing image filtering processing corresponding to the frequency characteristic according to the frequency characteristic of the each pixel point in the spatial domain includes:
  performing first image filtering processing on the target pixel point whose frequency characteristic is the low frequency and performing second image filtering processing whose smoothing intensity is less than that of the first image filtering processing on the target pixel point whose frequency characteristic is the high frequency, where
  the first image filtering processing is mean filtering and the second image filtering processing is weighted mean filtering.

Optionally, a first filtering matrix used in the first image filtering processing is larger than a second filtering matrix used in the second image filtering processing.

Optionally, a central value of the second filtering matrix used in the second image filtering processing is greater than surrounding values.

Optionally, the pixel points adjacent to the target pixel point include: a left pixel point located on the left of the target pixel point and a right pixel point located on the right of the target pixel point that are in the same row as the target pixel point; and a top pixel point located on the top of the target pixel point and a bottom pixel point located on the bottom of the target pixel point that are in the same column as the target pixel point.

Optionally, the performing second noise reduction processing on any two adjacent frames of target images in the multi-frame target image, to obtain inter-frame processing results includes:

sequentially detecting signal change characteristics of the multi-frame target image at pixel positions; and calculating grayscale values at the pixel positions according to the signal change characteristics.

Optionally, the sequentially detecting signal change characteristics of the multi-frame target image at pixel positions includes:

sequentially calculating, at a selected pixel position, a time domain distance between any two frames of target images in the multi-frame target image, where the time domain distance indicates a grayscale difference between pixels corresponding to positions in any two adjacent frames of target images in the multi-frame target image; and determining the signal change characteristic of each frame of target image at the selected pixel position according to the time domain distance.

Optionally, the signal change characteristic includes a static pixel and a moving pixel; and the determining the signal change characteristic of each frame of target image at a pixel point of the selected pixel position according to the time domain distance specifically includes:

selecting a frame of target image;

sequentially calculating a time domain distance between the selected target image and another frame of target image at each pixel position of a preset sampling window, where a center of the preset sampling window is the selected pixel position;

determining whether time domain distances at all pixel positions within the preset sampling window are greater than a preset threshold;

determining a pixel point of the selected target image at the selected pixel position as the moving pixel if all the time domain distances are greater than the preset threshold; and determining a pixel point of the selected target image at the selected pixel position as the static pixel if all the time domain distances are not greater than the preset threshold.

Optionally, the calculating output results at the pixel positions according to the signal change characteristics specifically includes:

calculating, at the selected pixel position, a mean value of the pixel points of the multi-frame target image and all static pixels; and determining the mean value as a grayscale value of the selected pixel position.

Optionally, the generating an enhanced night scene effect image of the target image according to the intra-frame processing result and the inter-frame processing result specifically includes:

determining weights of the intra-frame processing result and the inter-frame processing result; and performing weighted calculation on the intra-frame processing result and the inter-frame processing result, to obtain the enhanced night scene effect image.

Optionally, the weighted calculation is performed on the intra-frame processing result and the inter-frame processing result by using the following formula:

$$Y=(1-a)*Ys+a*Yt$$

where Y is an image processing result, Ys is the intra-frame processing result, Yt is the inter-frame processing result and a is the weight of the inter-frame processing result.

To resolve the foregoing technical problem, the embodiments of the present invention further provide the following technical solution: an image processing method for a camera module in a night scene. The image processing method for a camera module in a night scene includes:

receiving a photographing trigger instruction;

continuously acquiring two or more frames of target images at a preset speed; and performing the foregoing image processing method on the multi-frame target image, to obtain enhanced night scene effect images.

To resolve the foregoing technical problem, the embodiments of the present invention further provide the following technical solution: an electronic device.

The electronic device includes: a processor and a memory communicatively connected to the processor, where the memory stores computer program instructions, the computer program instructions, when invoked by the processor, causing the processor to perform the foregoing image processing method.

To resolve the foregoing technical problem, the embodiments of the present invention further provide the following technical solution: an apparatus for a camera module in a night scene. The apparatus for a camera module in a night scene includes:

an image sensor, configured to acquire a multi-frame target image based on a specified photographing parameter; a controller, connected to the image sensor and configured to trigger the image sensor to perform continuous exposure at a specified speed to acquire at least two frames of images; an image processor, configured to receive the at least two frames of images acquired by the image sensor through continuous exposure and perform the foregoing image processing method on the at least two received frames of images, to obtain enhanced night scene effect images; and a storage device, connected to the image processor and configured to store the enhanced night scene effect images.

Optionally, the apparatus for a camera module in a night scene further includes a brightness sensor and the brightness sensor is configured to sense current ambient brightness and provide the ambient brightness to the controller. The controller is configured to trigger the image sensor to perform continuous exposure at a specified speed to acquire at least two frames of images when the ambient brightness is lower than a specified value.

Compared with the prior art, in the image processing method of the embodiments of the present invention, based on a plurality of consecutive image frames, noise in a spatial domain and noise in a time domain are separately processed to achieve a better noise reduction effect and especially to greatly improve a photographing effect in a low-brightness or a dim environment and present a sharp and low-noise image to a user.

BRIEF DESCRIPTION OF THE DRAWINGS

One or more embodiments are exemplarily described with reference to the corresponding figures in the accompanying drawings and the exemplary descriptions are not to be construed as limiting the embodiments. Components in the accompanying drawings that have same reference numerals are represented as similar components and unless otherwise particularly stated, the figures in the accompanying drawings are not drawn to scale.

DETAILED DESCRIPTION

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings and are used only for ease and brevity of illustration and description of the present invention, rather than indicating or implying that the mentioned apparatus or component needs to have a particular orientation or needs to be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the present invention are the same as that usually understood by a person skilled in the art to which the present invention belongs. In the present invention, terms used in the specification of the present invention are merely intended to describe objectives of the specific embodiments, but are not intended to limit the present invention. A term "and/or" used in this specification includes any or all combinations of one or more related listed items.

In addition, technical features involved in different embodiments of the present invention described below may be combined together if there is no conflict.

When a camera takes a photo, a luminous flux entering a photosensitive element through an optical component of the camera is a very important indicator. Therefore, when photographing is performed in a situation of insufficient light in an external environment (for example, night scene photographing), a manner of extending an exposure time and increasing sensitivity of the photosensitive element is usually adopted to deal with the situation of insufficient light in the external environment.

Applying the photographing method provided in the embodiments of the present invention to a camera can effectively alleviate problems of smear and excessive noise caused by high ISO that occur in an acquired image, so as to enhance an image photographing effect in a dim environment.

Figure 1:
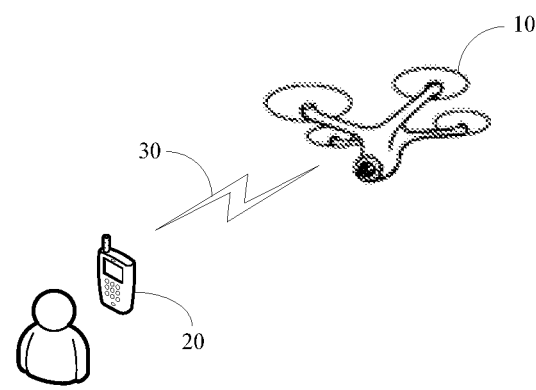
FIG. 1 is a schematic diagram of an application scenario according to an embodiment of the present invention.

FIG. 1 shows an application scenario of an aerial camera according to an embodiment of the present invention. As shown in FIG. 1, an unmanned aerial vehicle 10 carrying an aerial camera, a smart terminal 20 and a wireless network 30 are included in the application scenario.

The unmanned aerial vehicle 10 may be any type of power-driven unmanned aerial vehicle, including, but not limited to, a quadrotor unmanned aerial vehicle, a fixed-wing aircraft and a helicopter model. The unmanned aerial vehicle may have a corresponding volume or power according to an actual requirement, to provide a load capacity, a flight speed and a flight endurance mileage that can meet a use requirement.

The aerial camera may be any type of image acquisition device, including an action camera, a high-definition camera, or a wide-angle camera. As one of functional modules carried on the unmanned aerial vehicle, the aerial camera may be mounted and fixed on the unmanned aerial vehicle through a mounting and fixing bracket such as a gimbal and is controlled by the unmanned aerial vehicle 10 to perform image acquisition tasks.

Certainly, one or more functional modules can alternatively be added to the unmanned aerial vehicle to enable the unmanned aerial vehicle to achieve corresponding functions. For example, a built-in main control chip, as a control core or an image transmission apparatus for flight and data transmission of the unmanned aerial vehicle, uploads acquired image information to a device that establishes a connection to the unmanned aerial vehicle.

The smart terminal 20 may be any type of smart device configured to establish a communication connection to the unmanned aerial vehicle, for example, a mobile phone, a tablet computer, a smart remote control or the like. The smart terminal 20 may be equipped with one or more types of different user interaction apparatuses configured to acquire user instructions or present and feed back information to a user.

The interaction apparatuses include, but are not limited to, a button, a display screen, a touchscreen, a speaker and a remote control joystick. For example, the smart terminal 20 may be equipped with a touch display screen. Through the touch display screen, a remote control instruction for the unmanned aerial vehicle is received from a user and image information obtained through the aerial camera is presented to the user. The user may further switch the image information currently displayed on the display screen through a remote control touchscreen.

In some embodiments, the existing image vision processing technology may be further fused between the unmanned aerial vehicle 10 and the smart terminal 20 to further provide more intelligent services. For example, the unmanned aerial vehicle 10 may acquire images through an aerial camera and then the smart terminal 20 analyzes operation gestures in an image, so as to finally implement gesture control for the unmanned aerial vehicle 10 by the user.

The wireless network 30 may be a wireless communication network configured to establish a data transmission channel between two nodes based on any type of data transmission principle, for example, a Bluetooth network, a Wi-Fi network, a wireless cellular network, or a combination thereof located in a specific signal frequency band.

Figure 2:
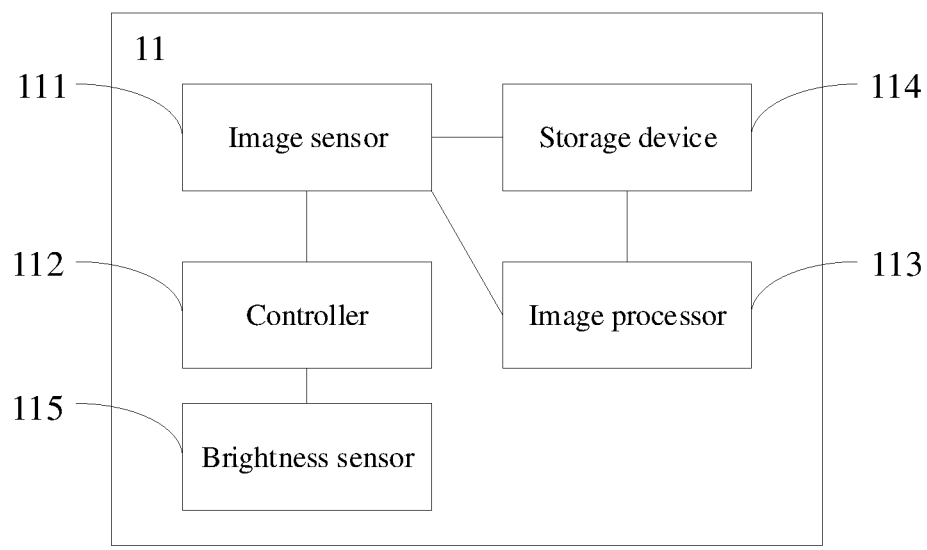
FIG. 2 is a structural block diagram of an aerial camera according to an embodiment of the present invention.

FIG. 2 is a structural block diagram of an aerial camera 11 according to an embodiment of the present invention. As shown in FIG. 2, the aerial camera 11 may include: an image sensor 111, a controller 112, an image processor 113 and a storage device 114.

The image sensor 111 is a functional module configured to acquire an image frame based on a specified photographing parameter. The image sensor projects an optical signal corresponding to a visual picture onto a photosensitive element through a lens and a related optical component and the photosensitive element converts the optical signal into a corresponding electrical signal.

The photographing parameter is an adjustable parameter variable of the image sensor 111 such as an aperture, a focal length, or an exposure time related to structures of the lens and the related optical component (for example, a shutter) during image acquisition. A target image refers to image data acquired by the image sensor 111 through one time of exposure.

The controller 112 is a control core of the image sensor 111. The controller is connected to the image sensor and can correspondingly control a photographing behavior of the image sensor 111 according to a received instruction, for example, set one or more photographing parameters of the image sensor 111.

Under an appropriate trigger condition, the controller 112 can trigger the image sensor to perform continuous exposure at a specified speed to acquire at least two frames of target images. The specified speed is an artificially specified constant value, which may be a default value preset by a technician, or may be a value set by a user according to an actual requirement during use.

The image processor 113 is a functional module for image effect enhancement. The image processor can receive the at least two frames of target images acquired by the image sensor through continuous exposure and perform a corresponding image processing method on the target images, to obtain an enhanced night scene effect image.

The enhanced night scene effect image is an output result obtained through integration performed by the image processor 113 after performing image processing based on an acquired multi-frame target image and may have better sharpness and lower noise than an original acquired target image.

The storage device 114 is a device for storing data information such as an enhanced night scene effect image generated by the aerial camera 11 during use. The storage device may be specifically any type of non-volatile memory with suitable capacity, such as an SD card, a flash memory, or a solid state drive.

In some embodiments, the storage device 114 may be further a detachable structure or a distributed arrangement structure. The aerial camera may only be provided with a data interface and data such as the enhanced night scene effect image is transferred to a corresponding device for storage through the data interface.

It should be noted that one or more functional modules (for example, the controller, the image processor and the storage device) of the aerial camera 11 shown in FIG. 2 may alternatively be integrated into the unmanned aerial vehicle 10 to serve as a part of the unmanned aerial vehicle 10. The functional modules of the aerial camera 11 are exemplarily described in FIG. 2 merely based on an image acquisition process and the functional modules of the aerial camera 11 are not limited thereto.

Figure 3:
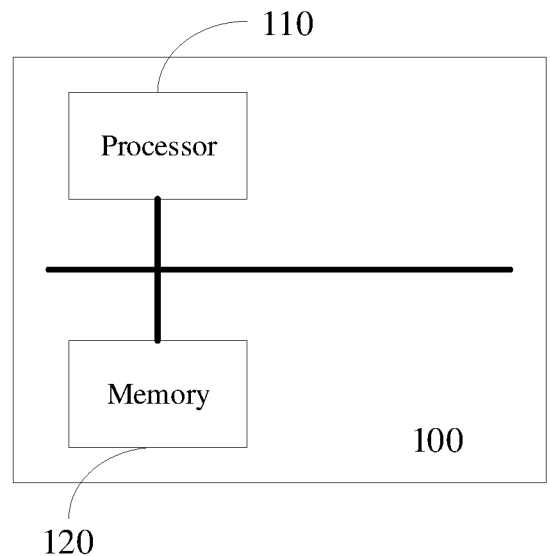
FIG. 3 is a schematic structural diagram of an electronic device according to an embodiment of the present invention.

FIG. 3 is a structural block diagram of an electronic device according to an embodiment of the present invention. The electronic device may be configured to implement all or some of functions of an image processor and/or a controller. As shown in FIG. 3, the electronic device 100 may include a processor 110 and a memory 120.

A communication connection is established between the processor 110 and the memory 120 through a bus.

The processor 110 may be any type of processor that has one or more processing cores, which can perform single-threaded or multi-threaded operations and is configured to analyze instructions to perform operations such as obtaining data, performing logical operation functions and delivering operation processing results.

The memory 120 is used as a non-volatile computer-readable storage medium, for example, at least one magnetic disk storage device, a flash memory, a distributed storage device remotely disposed relative to the processor 110 or another non-volatile solid-state storage device.

The memory 120 may have a program storage region used to store a non-volatile software program, a non-volatile computer-executable program and a module to be invoked by the processor 110 to enable the processor 110 to perform one or more method steps. The memory 120 may further have a data storage region used to store an operation processing result delivered and outputted by the processor 110.

Still referring to FIG. 1, in an actual use process, different photographing modes may be adopted by the aerial camera carried on the unmanned aerial vehicle 10 according to different photographing environments and specific usage conditions.

According to an aspect, when ambient brightness is normal and a luminous flux is sufficient, the aerial camera carried on the unmanned aerial vehicle 10 may start a photographing action according to a photographing instruction issued by a user in the smart terminal 20 and feed back a target image obtained through photographing.

According to another aspect, when the unmanned aerial vehicle 10 performs photographing tasks in a dim environment such as outdoors at night, limited by a problem of ambient light, after receiving a photographing instruction, the aerial camera usually requires a relatively long exposure time and high photosensitivity to perform photographing.

In this way, it is easy to cause a smear due to the long exposure time and cause a large amount of background noise due to the use of high photosensitivity in an original image obtained through photographing.

Therefore, when performing photographing in the dim environment, the aerial camera may adopt the image processing method provided in the embodiments of the present invention to avoid smear and noise problems.

The controller can trigger the image sensor to perform continuous exposure, acquire a multi-frame target image and provide the multi-frame target image to the image processor for comprehensive processing. Finally, after the image processing method is performed by the image processor, enhanced night scene effect images with clean image backgrounds and sharp and clear object outlines are obtained.

The enhanced night scene effect images may be provided to the smart terminal 20 for storage or presentation to the user and may also be stored by a storage device of the aerial camera 11.

In a preferable embodiment, still referring to FIG. 2, to implement the image processing method at an appropriate time, the aerial camera further includes a brightness sensor 115.

The brightness sensor 115 may be disposed outside the aerial camera and configured to sense current ambient brightness. The controller 112 may determine whether the image processing method needs to be performed according to the current ambient brightness. For example, when the ambient brightness is lower than a specified value, the image processing method is performed.

In some other embodiments, the controller 112 may alternatively display prompt information on the smart terminal in a prompt information manner when the ambient brightness is lower than the specified value, to prompt the user that the image processing method needs to be performed.

An example in which the image processing method is applied to the aerial camera carried on the unmanned aerial vehicle is used in the application scenario shown in FIG. 1, but a person skilled in the art may understand that the image processing method may also be applied to another type of image acquisition apparatus, to improve a photographing effect of the image acquisition apparatus in a dim environment. The image processing method disclosed in the embodiments of the present invention is not limited to being applied to the unmanned aerial vehicle shown in FIG. 1.

Figure 4:
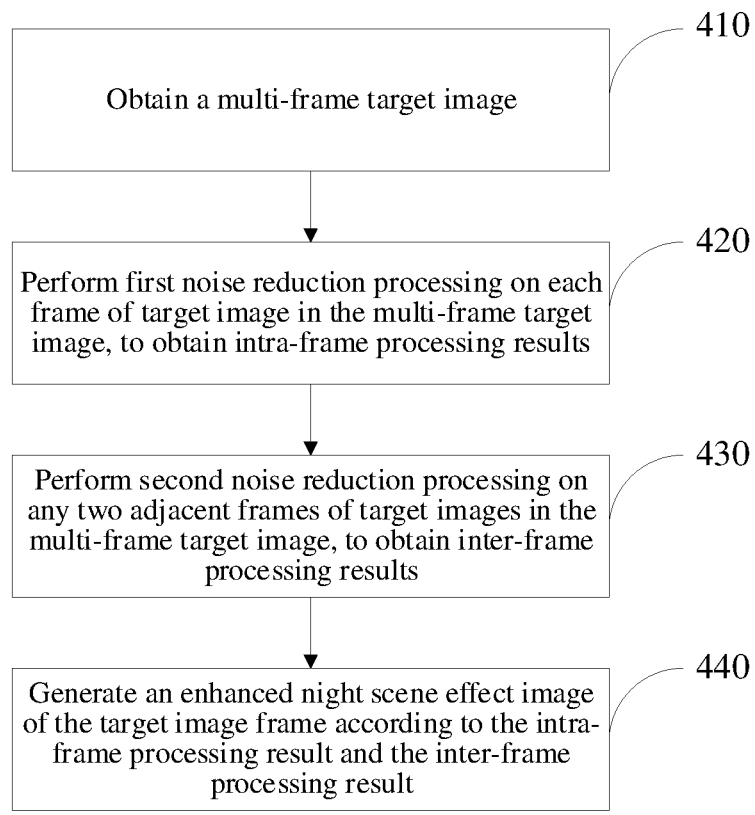
FIG. 4 is a method flowchart of an image processing method according to an embodiment of the present invention.

FIG. 4 is a method flowchart of an image processing method according to an embodiment of the present invention. As shown in FIG. 4, the image processing method includes the following steps:

410. Obtain a multi-frame target image.

There is a time linear relationship between the obtained frames of images and the images may be arranged into an image sequence according to time.

Specifically, a series of images may be obtained by an image sensor in a continuous exposure manner. A quantity of times and an interval time of continuous exposure are artificially specified values and may be set by a technician or a user according to an actual requirement.

420. Perform first noise reduction processing on each frame of target image in the multi-frame target image, to obtain intra-frame processing results.

The first noise reduction processing refers to a set of one or more operation steps performed on each pixel point in a spatial domain of the images. An effect of the processing is to reduce spatial domain noise (that is, background noise in the application scenario shown in FIG. 1) of the target image.

In such a noise reduction process, only a target image frame is used for reference and other target image frames are not considered. Therefore, the "intra-frame processing result" is used herein to indicate an output obtained after the target image frame is subject to the first noise reduction processing.

430. Perform second noise reduction processing on any two adjacent frames of target images in the multi-frame target image, to obtain inter-frame processing results.

The second noise reduction processing refers to a set of one or more operation steps performed on each pixel point according to signal changes of adjacent target images. An objective of the processing is to reduce a smear phenomenon caused by a long exposure time as much as possible. The smear is caused by excessive changes of an image signal at different moments. Therefore, the smear may also be considered as time domain noise.

In the second noise reduction process, the time domain noise is filtered out and a relationship between the target image frame and an adjacent image frame needs to be used for reference. Therefore, the "inter-frame processing result" is used herein to indicate an output obtained after the target image frame is subject to the second noise reduction processing.

440. Generate an enhanced night scene effect image of the target image according to the intra-frame processing result and the inter-frame processing result.

The intra-frame processing result and the inter-frame processing result that are obtained based on two different noise reduction objectives need to be finally combined together in a specified manner to generate a final output of the enhanced night scene effect image.

"Combination" is a processing process of comprehensively considering the intra-frame processing result and the inter-frame processing result and calculating and determining one output based on two pieces of input data. In the processing process, any type of model or function may be specifically adopted for calculation according to requirements of an actual application or features of a photographing environment.

In some embodiments, a weighted calculation manner may be adopted. First, weights of the intra-frame processing result and the inter-frame processing result are determined. Subsequently, the weighted calculation is performed on the intra-frame processing result and the inter-frame processing result, to obtain the enhanced night scene effect image.

Specifically, an image processing result may be calculated by using the following formula (1):

$$Y=(1-a)*Ys+a*Yt \tag{1}$$

where Y is an output, Ys is an intra-frame processing result, Yt is an inter-frame processing result and a is a weight of the inter-frame processing result.

In this embodiment, a sum of the weights of the intra-frame processing result and the inter-frame processing result is 1. A technician may correspondingly change noise reduction intensity of the image processing result for time domain noise and spatial domain noise by adjusting a value of a, to adapt to different photographing environments and output a corresponding enhanced night scene effect image.

For example, when the value of a is increased, the noise reduction intensity for the time domain noise may be increased, so that the image is sharper and edges are clearer. However, when the value of a is reduced, the noise reduction intensity for the spatial domain noise may be increased, so that background noise of the image processing result may be smoothly eliminated.

In the image processing method provided in this embodiment of the present invention, the first noise reduction processing and the second noise reduction processing are separately used and elimination of the spatial domain noise and the time domain noise is considered, thereby achieving a better noise reduction effect on an image frame acquired in a dim environment.

In some embodiments, to improve an effect of the first noise reduction processing, a specific noise reduction method adopted may be further adjusted adaptively according to features of pixel points to obtain a better intra-frame processing result.

First, frequency characteristics of the pixel points of the target image frame in the spatial domain are sequentially detected. Subsequently, image filtering processing corresponding to the frequency characteristics is performed on the pixel points.

The frequency characteristic in the spatial domain indicates a magnitude of a signal change frequency of the pixel point with respect to neighboring pixel points. The frequency characteristic is related to an image picture and is a relatively important parameter in image processing. For example, pixel points at an edge part of the image have higher signal change frequencies, while pixel points at a background part of the image have lower signal change frequencies.

Each typical noise reduction processing is an image filtering process by using a pixel point as a unit. Different image filtering processing has corresponding features based on a difference in matrix size or weight distribution.

Based on the frequency characteristic of the pixel point, an adaptive capability may be provided by choosing to allocate corresponding image filtering processing for the frequency characteristic, so that the first noise reduction processing can be correspondingly adjusted according to pictures of the target image frame in different parts, thereby effectively improving an effect of the noise reduction processing.

Generally, a specific signal change frequency of each pixel point in the target image frame may be obtained in a Fourier transform manner. However, the Fourier transform is a complex calculation process and needs to consume a large quantity of computing resources. Therefore, in a preferable embodiment, a detection method shown in FIG. 5 may be further used for simply determining the frequency characteristic of the pixel point, to reduce a calculation amount.

Figure 5:
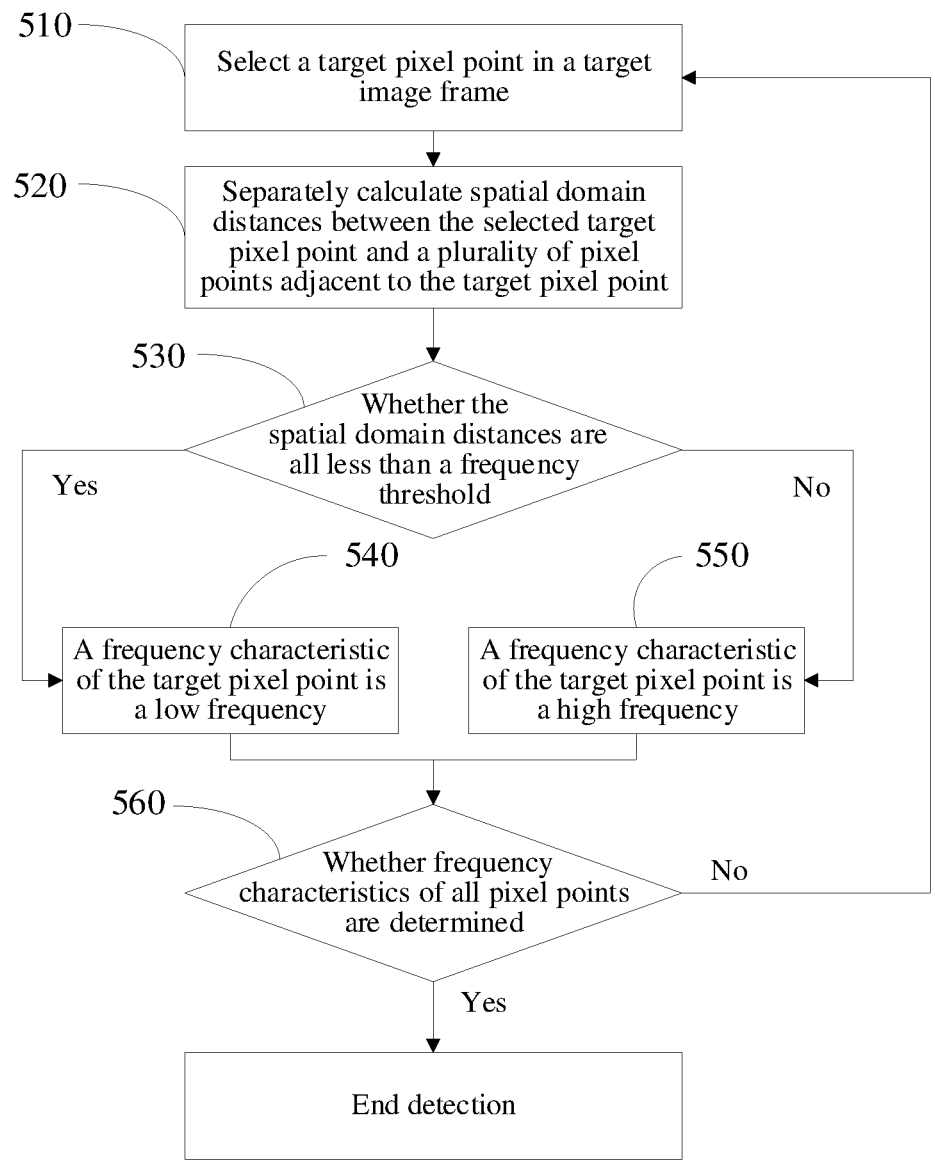
FIG. 5 is a method flowchart of a frequency characteristic detection method according to an embodiment of the present invention.

As shown in FIG. 5, the detection method may include the following steps:

510. Select a target pixel point in a target image frame.

The target pixel point may be specifically selected from the target image frame in any manner or by following any rule, as long as it is ensured that the pixel point whose frequency characteristic has been determined will not be repeatedly selected.

520. Separately calculate spatial domain distances between the selected target pixel point and a plurality of pixel points adjacent to the target pixel point.

The spatial domain distance indicates a signal difference between two pixel points in the same image frame. Specifically, in an image frame preprocessed into a brightness image, the spatial domain distance may indicate a grayscale difference between the selected target pixel point and a pixel point adjacent to the target pixel point.

Figure 6:
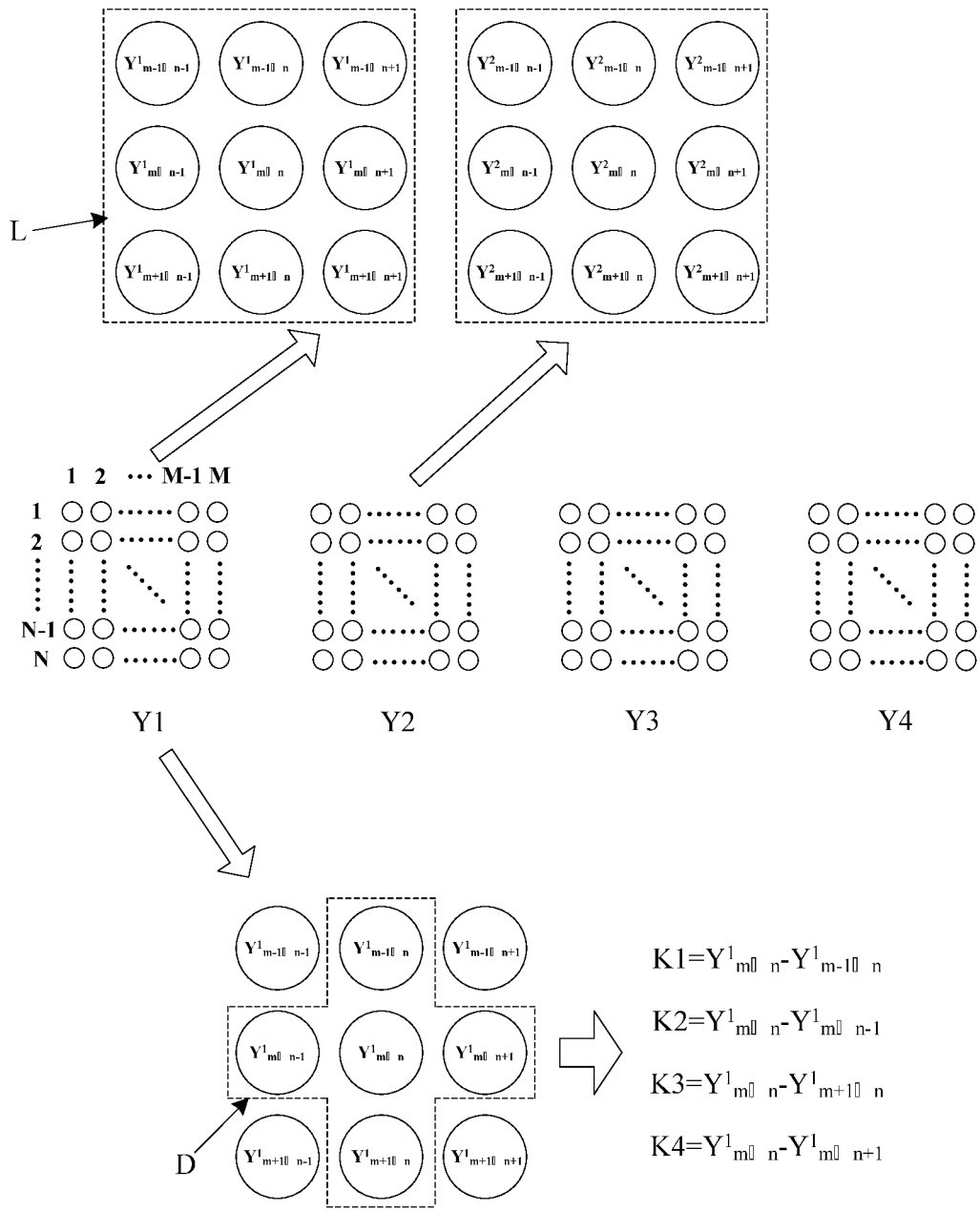
FIG. 6 is a schematic diagram of image frame processing according to an embodiment of the present invention.

According to different sampling templates used in detection, a quantity of adjacent pixel points also changes correspondingly. Specifically, as shown in FIG. 6, a sampling template M may be cross-shaped and adjacent pixel points sampled each time include: a left pixel point L and a right pixel point R that are in the same row as the target pixel point and are respectively located on the left and right of the target pixel point and a top pixel point T and a bottom pixel point B that are in the same column as the target pixel point and are respectively located on the top and bottom of the target pixel point.

530. Determine whether the spatial domain distances between the target pixel point and the plurality of pixel points adjacent to the target pixel point are all less than a frequency threshold. If yes, perform step 540; if not, perform step 550.

A "frequency threshold" is a standard used for delimiting high frequency and low frequency parts and may be set by a technician according to an actual requirement, or may be a value that is adjusted adaptively as a situation changes.

540. Determine the frequency characteristic of the target pixel point as the low frequency. The low frequency is a relative concept, which indicates that a currently detected pixel point is in a relatively low frequency part of an entire image frame.

550. Determine the frequency characteristic of the target pixel point as the high frequency. The high frequency is a relative concept, which indicates that a currently detected pixel point is in a relatively high frequency part of an entire image frame.

560. Determine whether frequency characteristics of all pixel points of the target image frame are determined. If not, return to step 510; if yes, end the detection.

The entire detection process is performed sequentially by using a pixel point as a unit and ends until all pixel points are traversed once.

In the frequency characteristic detection method shown in FIG. 5, a dichotomy (that is, two different frequency characteristics are obtained through division according to one frequency threshold) is used as an example for description. However, a person skilled in the art may understand that a quantity of types of the frequency characteristics and a frequency characteristic to which a pixel point belongs may be further determined according to the known frequency threshold and spatial domain distance by using another different type of determining manner, for example, three different frequency characteristics are obtained through division according to two frequency thresholds.

Based on a division result of the high frequency and the low frequency, in some embodiments, first image filtering processing may be performed on the low frequency and second image filtering processing whose smoothing intensity is less than that of the first image filtering processing is performed on the high frequency.

The first image filtering processing is mean filtering and the second image filtering processing is weighted mean filtering.

The mean filtering is a windowing process based on a filtering matrix. As shown in FIG. 6, the process may roughly include the following steps: A sampling window first selects a pixel region whose size is equivalent to that of the filtering matrix and then a signal of each pixel point is multiplied by an element at a corresponding position in the filtering matrix. Finally, calculation results of signals of all pixel points are superimposed as a signal of the target pixel point.

It may be understood that a larger filtering matrix includes more elements and corresponds to larger smoothing intensity, so that the signal of the pixel point tends to be average. In addition, values of the elements in the filtering matrix may be different, so that different pixel points are given different weights during smoothing to highlight a part of the pixel points. When such a filtering matrix is used, the mean filtering may also be referred to as "weighted mean filtering".

As described in the foregoing embodiment, the low frequency may highly probably be considered as a background part in the target image frame and the background part is a region in which noise is most likely to appear during high-photosensitivity photographing. Therefore, for the low frequency part, mean filtering with very large smoothing intensity may be selected for noise reduction to eliminate noise as much as possible.

Specifically, to ensure sufficient smoothing intensity, a first filtering matrix used in the first image filtering processing is larger than a second filtering matrix used in the second image filtering processing, thereby achieving a stronger smoothing effect and eliminating noise as much as possible.

The high frequency should be classified as a foreground part of the target image frame, which includes a photographing target that a user intends to observe. Therefore, it is always intended to retain texture information of the high frequency parts as much as possible to ensure clarity of an image.

Specifically, to retain the texture information of the high frequency, a central value of the second filtering matrix used in the second image filtering processing is greater than surrounding values. That is, a value of an element located at a center of the filtering matrix is larger, while values of elements located at edges of the filtering matrix are smaller. Therefore, features of a signal of a pixel point located at the center of the filtering matrix are better highlighted.

In such a first noise reduction processing method, different types of filtering processing are respectively performed on the high frequency and the low frequency of the target image and have respective focuses, so that a more outstanding noise reduction effect may be achieved.

In some other embodiments, the second noise reduction processing may sequentially detect the signal change characteristics of the multi-frame target image at pixel positions by using a pixel position as a processing unit. Subsequently, an output result at each pixel position is calculated according to the signal change characteristic.

The signal change characteristic is an indicator that measures a magnitude of a signal change amplitude between the target image and an adjacent target image. Based on a manner in which the camera acquires the target image, a technician may understand that the signal change characteristic indicates a smear phenomenon at the pixel position, which may be used as a basis for calculation to remove time domain noise.

Figure 7:
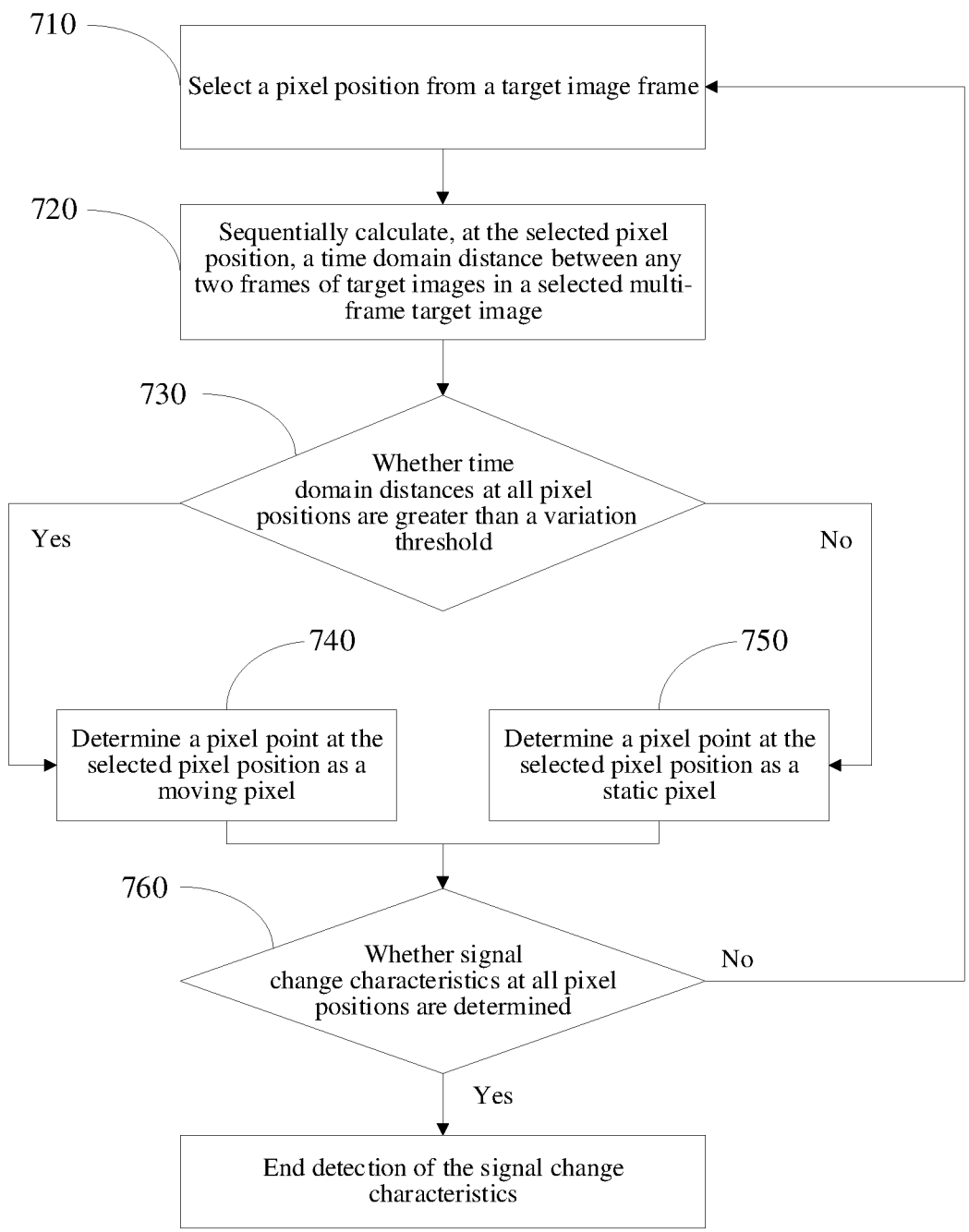
FIG. 7 is a flowchart of a method for detecting a signal change characteristic according to an embodiment of the present invention.

FIG. 7 is a flowchart of a method for detecting a signal change characteristic according to an embodiment of the present invention. As shown in FIG. 7, the method includes the following steps:

710. Select a pixel position from a target image frame.

The pixel position may be specifically sequentially selected from the target image in any manner or by following any rule, as long as it is ensured that each pixel position in the target image can be traversed.

720. Sequentially calculate, at the selected pixel position, a time domain distance between any two frames of target images in a multi-frame target image.

The time domain distance refers to a grayscale difference, at the selected position, between any two adjacent frames of target images in the multi-frame target image.

Specifically, when the time domain distance is calculated, a preset sampling window is adopted for calculation. The preset sampling window is a region with a set size that includes a plurality of pixel positions and is used for acquiring pixel point signals within the region. The preset sampling window is generated by expanding outward with the selected pixel position as a center.

The time domain distance indicates signal changes over time between adjacent target images during a plurality of times of exposure.

730. Determine whether time domain distances at all pixel positions within the preset sampling window are greater than a preset threshold. If yes, perform step 740; if not, perform step 750.

The preset "threshold" is a standard used for delimiting being moving and being static and may be set by a technician according to an actual requirement, or may be a value that is adjusted adaptively as a situation changes.

740. Determine a pixel point of the target image at the selected pixel position as a moving pixel. The moving pixel is a relative concept, which indicates that a signal change at the pixel position is too large and a smear phenomenon is likely to occur.

750. Determine a pixel point of the target image at the selected pixel position as a static pixel.

The static pixel is also a relative concept, which indicates that a signal change at the pixel position is relatively small and it is basically impossible for a smear to occur at the position.

760. Determine whether signal change characteristics at all pixel positions are determined; if not, return to step 710; if yes, end the detection of the signal change characteristics.

In the embodiment shown in FIG. 7, the signal change characteristics at the pixel positions are simply divided into moving pixels and static pixels according to magnitudes of change amplitudes. However, a person skilled in the art may understand that a specific signal change characteristic may be further determined by using another different type of determining manner.

Figure 8:
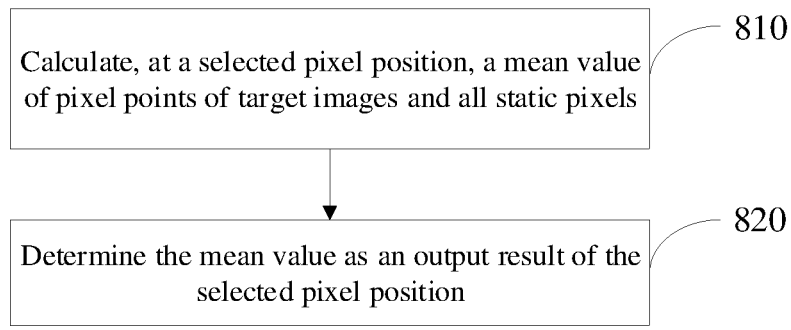
FIG. 8 is a flowchart of a second noise reduction processing method according to an embodiment of the present invention.

Based on a division result of the moving pixel and the static pixel, in some embodiments, a second noise reduction processing method shown in FIG. 8 may be adopted for filtering out time domain noise to increase sharpness of an image. As shown in FIG. 8, the second noise reduction processing method may include the following steps:

810. Calculate, at the selected pixel position, a mean value of the pixel points of the target images and all static pixels. The mean value refers to a mean value of signals of pixel points. Specifically, a grayscale value may be selected.

820. Determine the mean value as a grayscale value of the selected pixel position.

After a grayscale value of a pixel position is determined, step 810 and step 820 may be further repeatedly performed until grayscale values of all pixel positions are determined to obtain a final inter-frame processing result.

In a second noise reduction processing process in this embodiment, filtering out interference of the moving pixels may better avoid a smear phenomenon during photographing. In addition, a process of performing mean filtering on the static pixels may also well eliminate the time domain noise.

A process of performing the image processing method disclosed in this embodiment of the present invention is described in detail below with reference to specific examples. Assuming that after receiving a photographing instruction, a controller controls an image sensor to perform continuous exposure and sequentially acquire four frames of target images Y1, Y2, Y3 and Y4 shown in FIG. 6, each target image is generated by M rows and N columns of pixel points and the pixel points are grayscale values.

(1) First noise reduction processing process: A selected target pixel point is represented by $Y^1_{m,n}$, where m and n indicate that the target pixel point is in an $m^{th}$ row and an $n^{th}$ column of the target image $Y^1$.

First, four adjacent pixel points are obtained through a cross-shaped detection window D and grayscale value differences K1, K2, K3 and K4 between the adjacent pixel points and the target pixel point located at a center are calculated.

A frequency threshold S is used as a determination standard. Whether a frequency characteristic of the target pixel point is a low frequency or a high frequency is determined according to K1, K2, K3 and K4. Only when the target pixel point simultaneously meets conditions that K1 is less than the frequency threshold S, K2 is less than the frequency threshold S, K3 is less than the frequency threshold S and K4 is less than the frequency threshold S, the target pixel point is determined to be in the low frequency. Otherwise, the target pixel point is determined to be in the high frequency. Specifically, a value of S is 20.

Subsequently, mean filtering is performed on a pixel point in the low frequency by using a 5×5 filtering matrix $$\begin{bmatrix} 0.04 & 0.04 & 0.04 & 0.04 & 0.04 \\ 0.04 & 0.04 & 0.04 & 0.04 & 0.04 \\ 0.04 & 0.04 & 0.04 & 0.04 & 0.04 \\ 0.04 & 0.04 & 0.04 & 0.04 & 0.04 \\ 0.04 & 0.04 & 0.04 & 0.04 & 0.04 \end{bmatrix}.$$

That is, an intra-frame processing result of the pixel point is calculated by using the following formula (2):

$$Ys_{m,n} = \frac{Y^1_{m-2,n-2} + \ldots + Y^1_{m,n} + \ldots + Y^1_{m+2,n+2}}{25} \quad (2)$$

where $Ys_{m,n}$ is the intra-frame processing result. When a larger-size mean filtering matrix is adopted for a low frequency part, spatial domain noise can be greatly reduced.

Finally, weighted mean filtering is performed on a pixel point in the high frequency by using a 3×3 filtering matrix $$\begin{bmatrix} 1 & 1 & 1 \\ 1 & 9 & 1 \\ 1 & 1 & 1 \end{bmatrix}.$$

That is, an intra-frame processing result of the pixel point is calculated by using the following formula (3):

$$Ys_{m,n} = \frac{Y^1_{m-1,n-1} + Y^1_{m-1,n} + Y^1_{m-1,n+1} + Y^1_{m,n-1} + 9Y^1_{m,n} + Y^1_{m,n+1} + Y^1_{m+1,n-1} + Y^1_{m+1,n} + Y^1_{m+1,n+1}}{9} \quad (3)$$

where $Ys_{m,n}$ is the intra-frame processing result. A filtering matrix used in the weighted mean filtering has features of a large central value and small surrounding values and a size of the matrix is much smaller than that of the mean filtering matrix used in the low frequency part, which can better retain texture information of the high frequency part.

(2) Second noise reduction processing process: In this embodiment, a selected pixel position is represented by $Y_{m,n}$ and subscripts m and n respectively represent pixels in an $m^{th}$ row and an $n^{th}$ row. A preset sampling window L is a 3×3 rectangle.

First, time domain distances of the target image frame Y1 and the target image frame Y2 at all pixel positions of the preset sampling window are sequentially calculated according to the selected pixel position.

Subsequently, whether a pixel point at the selected pixel position is a static pixel or a moving pixel is determined by using the following formula (4). Only when all conditions shown in formula (4) are met, the pixel point is determined to be the static pixel; otherwise, the pixel point is determined to be the moving pixel.

$$\begin{cases} |Y^2_{m-1,n-1} - Y^1_{m-1,n-1}| < T| \\ |Y^2_{m-1,n} - Y^1_{m-1,n}| < T| \\ |Y^2_{m-1,n+1} - Y^1_{m-1,n+1}| < T| \\ |Y^2_{m,n-1} - Y^1_{m,n-1}| < T| \\ |Y^2_{m,n} - Y^1_{m,n}| < T| \\ |Y^2_{m,n+1} - Y^1_{m,n+1}| < T| \\ |Y^2_{m+1,n-1} - Y^1_{m+1,n-1}| < T| \\ |Y^2_{m+1,n} - Y^1_{m+1,n}| < T| \\ |Y^2_{m+1,n+1} - Y^1_{m+1,n+1}| < T| \end{cases} \quad (4)$$

where T is a variation threshold and $Y^2_{m,n}$ is a pixel point of the image frame Y2 in an $m^{th}$ row and an $n^{th}$ column.

Finally, all moving pixels are filtered out and a mean grayscale value of the pixel points of the target image frame at the selected pixel position and all the static pixels is calculated as an inter-frame processing result of the selected pixel position.

For example, when all pixel points of Y2, Y3 and Y4 at the selected pixel position are static pixels, an output result at the selected pixel position may be calculated by using the following formula (5).

$$Yt_{m,n} = \frac{Y^1_{m,n} + Y^2_{m,n} + Y^3_{m,n} + Y^4_{m,n}}{4} \quad (5)$$

where $Yt_{m,n}$ is the output result at the selected pixel position.

When all the pixel points of Y2, Y3 and Y4 at the selected pixel position are moving pixels, a grayscale value of the target image may be directly used as the output result.

After all the pixel points or the pixel positions of the target image are traversed by using the foregoing first noise reduction processing and second noise reduction processing methods, an inter-frame processing result and an intra-frame processing result of the target image may be outputted.

(3) Combination of the inter-frame processing results and the intra-frame processing results:

After the inter-frame processing result and the intra-frame processing result of the target image frame are obtained, the two results can be integrated according to formula (1) to obtain a final enhanced night scene effect image.

A person of ordinary skill in the art may be further aware that, in combination with examples of each step of the dual-light image integration method described in the embodiments disclosed in this specification, the present application may be implemented by using electronic hardware, computer software, or a combination thereof. To clearly describe interchangeability between the hardware and the software, compositions and steps of each example have been generally described according to functions in the foregoing descriptions. Whether the functions are executed in a mode of hardware or software depends on particular applications and design constraint conditions of the technical solutions.

A person skilled in the art may use different methods to implement the described functions for each particular application, but this implementation shall not be considered as going beyond the scope of the present invention. The computer software may be stored in a computer-readable storage medium. When being executed, the program may include the processes of the embodiments of the foregoing methods. The storage medium may be a magnetic disk, an optical disc, a read-only memory (ROM), or a random access memory (RAM).

Finally, it should be noted that the foregoing embodiments are merely used to describe the technical solutions of the present invention, but are not intended to limit the present invention. Under the concept of the present invention, the technical features in the foregoing embodiments or different embodiments may be combined, the steps may be implemented in any sequence and there may be many other changes in different aspects of the present invention. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An image processing method for an aerial camera, comprising:
   obtaining a multi-frame target image;
   performing first noise reduction processing on each frame of target image in the multi-frame target image, to obtain intra-frame processing results of the multi-frame target image, wherein the first noise reduction processing is used for filtering out spatial domain noise of the each frame of target image in the multi-frame target image;
   performing second noise reduction processing on any two adjacent frames of target images in the multi-frame target image, to obtain inter-frame processing results, wherein the second noise reduction processing is used for filtering out time domain noise between any two adjacent frames of target images in the multi-frame target image; and
   generating an enhanced night scene effect image of the target image according to the intra-frame processing result and the inter-frame processing result;
   wherein the performing second noise reduction processing on any two adjacent frames of target images in the multi-frame target image, to obtain inter-frame processing results comprises:
   sequentially detecting signal change characteristics of the multi-frame target image at pixel positions; and
   calculating grayscale values at the pixel positions according to the signal change characteristics.

2. The image processing method according to claim 1, wherein the performing first noise reduction processing on each frame of target image in the multi-frame target image, to obtain intra-frame processing results comprises:
   sequentially detecting a frequency characteristic of each pixel point in each frame of target image in the multi-frame target image in a spatial domain; and
   performing image filtering processing corresponding to the frequency characteristic according to the frequency characteristic of the each pixel point in the spatial domain, to obtain the intra-frame processing results.

3. The image processing method according to claim 2, wherein the sequentially detecting a frequency characteristic of each pixel point in each frame of target image in the multi-frame target image in a spatial domain comprises:
   respectively calculating spatial domain distances between a selected target pixel point and a plurality of pixel points adjacent to the target pixel point, wherein the spatial domain distances indicate grayscale differences between the selected target pixel point and the pixel points adjacent to the target pixel point; and
   determining a frequency characteristic of the target pixel point according to the spatial domain distances and a frequency threshold.

4. The image processing method according to claim 3, wherein the frequency characteristic comprises a low frequency and a high frequency; and
   the determining a frequency characteristic of the target pixel point according to the spatial domain distances and a frequency threshold specifically comprises:
   determining whether the spatial domain distances between the target pixel point and the plurality of pixel points adjacent to the target pixel point are all less than the frequency threshold;
   determining the frequency characteristic of the target pixel point as the low frequency when the spatial domain distances are all less than the frequency threshold; and
   determining the frequency characteristic of the target pixel point as the high frequency when the spatial domain distances are not all less than the frequency threshold.

5. The image processing method according to claim 4, wherein the performing image filtering processing corresponding to the frequency characteristic according to the frequency characteristic of the each pixel point in the spatial domain comprises:
   performing first image filtering processing on the target pixel point whose frequency characteristic is the low frequency and performing second image filtering processing whose smoothing intensity is less than that of the first image filtering processing on the target pixel point whose frequency characteristic is the high frequency, wherein
   the first image filtering processing is mean filtering and the second image filtering processing is weighted mean filtering.

6. The image processing method according to claim 5, wherein a first filtering matrix used in the first image filtering processing is larger than a second filtering matrix used in the second image filtering processing.

7. The image processing method according to claim 5, wherein a central value of the second filtering matrix used in the second image filtering processing is greater than surrounding values.

8. The image processing method according to claim 3, wherein the pixel points adjacent to the target pixel point comprise: a left pixel point located on the left of the target pixel point and a right pixel point located on the right of the target pixel point that are in the same row as the target pixel point; and
   a top pixel point located on the top of the target pixel point and a bottom pixel point located on the bottom of the target pixel point that are in the same column as the target pixel point.

9. The image processing method according to claim 1, wherein the sequentially detecting signal change characteristics of the multi-frame target image at pixel positions comprises:
   sequentially calculating, at a selected pixel position, a time domain distance between any two frames of target images in the multi-frame target image, wherein the time domain distance indicates a grayscale difference between pixels corresponding to positions in any two adjacent frames of target images in the multi-frame target image; and determining the signal change characteristic of each frame of target image at the selected pixel position according to the time domain distance.

10. The image processing method according to claim 9, wherein the signal change characteristic comprises a static pixel and a moving pixel; and the determining the signal change characteristic of each frame of target image at a pixel point of the selected pixel position according to the time domain distance specifically comprises:

selecting a frame of target image;

sequentially calculating a time domain distance between the selected target image and another frame of target image at each pixel position of a preset sampling window, wherein a center of the preset sampling window is the selected pixel position;

determining whether time domain distances at all pixel positions within the preset sampling window are greater than a preset threshold;

determining a pixel point of the selected target image at the selected pixel position as the moving pixel when all the time domain distances are greater than the preset threshold; and determining a pixel point of the selected target image at the selected pixel position as the static pixel when all the time domain distances are not greater than the preset threshold.

11. The image processing method according to claim 10, wherein the calculating output results at the pixel positions according to the signal change characteristics specifically comprises:

calculating, at the selected pixel position, a mean value of the pixel points of the multi-frame target image and all static pixels; and determining the mean value as a grayscale value of the selected pixel position.

12. The image processing method according to claim 1, wherein the generating an enhanced night scene effect image of the target image according to the intra-frame processing result and the inter-frame processing result specifically comprises:

determining weights of the intra-frame processing result and the inter-frame processing result; and performing weighted calculation on the intra-frame processing result and the inter-frame processing result, to obtain the enhanced night scene effect image.

13. The image processing method according to claim 12, wherein the weighted calculation is performed on the intra-frame processing result and the inter-frame processing result by using the following formula:

$$Y=(1-a)*Ys+a*Yt$$

wherein Y is an image processing result, Ys is the intra-frame processing result, Yt is the inter-frame processing result and a is the weight of the inter-frame processing result.

14. An image processing method for a camera module in a night scene, comprising:

receiving a photographing trigger instruction;

continuously acquiring two or more frames of target images at a preset speed; and performing the following operations on the multi-frame target image:

performing first noise reduction processing on each frame of target image in the multi-frame target image, to obtain intra-frame processing results of the multi-frame target image, wherein the first noise reduction processing is used for filtering out spatial domain noise of the each frame of target image in the multi-frame target image;

performing second noise reduction processing on any two adjacent frames of target images in the multi-frame target image, to obtain inter-frame processing results, wherein the second noise reduction processing is used for filtering out time domain noise between any two adjacent frames of target images in the multi-frame target image; and generating an enhanced night scene effect image of the target image according to the intra-frame processing result and the inter-frame processing result;

wherein the performing second noise reduction processing on any two adjacent frames of target images in the multi-frame target image, to obtain inter-frame processing results comprises:

sequentially detecting signal change characteristics of the multi-frame target image at pixel positions; and calculating grayscale values at the pixel positions according to the signal change characteristics.

15. An electronic device, comprising a processor and a memory communicatively connected to the processor, wherein the memory stores computer program instructions, the computer program instructions, when invoked by the processor, causing the processor to perform the following operations:

obtaining a multi-frame target image;

performing first noise reduction processing on each frame of target image in the multi-frame target image, to obtain intra-frame processing results of the multi-frame target image, wherein the first noise reduction processing is used for filtering out spatial domain noise of the each frame of target image in the multi-frame target image;

performing second noise reduction processing on any two adjacent frames of target images in the multi-frame target image, to obtain inter-frame processing results, wherein the second noise reduction processing is used for filtering out time domain noise between any two adjacent frames of target images in the multi-frame target image; and generating an enhanced night scene effect image of the target image according to the intra-frame processing result and the inter-frame processing result;

wherein the performing second noise reduction processing on any two adjacent frames of target images in the multi-frame target image, to obtain inter-frame processing results comprises:

sequentially detecting signal change characteristics of the multi-frame target image at pixel positions; and calculating grayscale values at the pixel positions according to the signal change characteristics.

16. An apparatus for a camera module in a night scene, comprising:

an image sensor, configured to acquire a multi-frame target image based on a specified photographing parameter;

a controller, connected to the image sensor and configured to trigger the image sensor to perform continuous exposure at a specified speed to acquire at least two frames of images;

a storage device, connected to an image processor and configured to store an enhanced night scene effect image;

wherein the image processor, configured to:

receive the at least two frames of images acquired by the image sensor through continuous exposure and perform the following operations on the at least two received frames of images:

perform first noise reduction processing on each frame of target image in the multi-frame target image, to obtain intra-frame processing results of the multi-frame target image, wherein the first noise reduction processing is used for filtering out spatial domain noise of the each frame of target image in the multi-frame target image;

perform second noise reduction processing on any two adjacent frames of target images in the multi-frame target image, to obtain inter-frame processing results, wherein the second noise reduction processing is used for filtering out time domain noise between any two adjacent frames of target images in the multi-frame target image; and generate an enhanced night scene effect image of the target image according to the intra-frame processing result and the inter-frame processing result;

wherein the perform second noise reduction processing on any two adjacent frames of target images in the multi-frame target image, to obtain inter-frame processing results comprises:

sequentially detecting signal change characteristics of the multi-frame target image at pixel positions; and calculating grayscale values at the pixel positions according to the signal change characteristics.

17. The apparatus according to claim 16, wherein the apparatus further comprises a brightness sensor and the brightness sensor is configured to sense current ambient brightness and provide the ambient brightness to the controller.

* * * * *